United States Patent [19]

Blair

[11] Patent Number: 4,622,929

[45] Date of Patent: Nov. 18, 1986

[54] DEFLECTOR PISTON TWO-STROKE ENGINE

[75] Inventor: Gordon P. Blair, Newtownabbey, Northern Ireland

[73] Assignee: The Queen's University of Belfast, Belfast, Northern Ireland

[21] Appl. No.: 673,528

[22] Filed: Nov. 21, 1984

[30] Foreign Application Priority Data

Nov. 23, 1983 [GB] United Kingdom ............... 8331289

[51] Int. Cl.$^4$ .......................... F02B 75/02; F02F 3/24
[52] U.S. Cl. .................... 123/65 A; 123/661; 123/307
[58] Field of Search ............ 123/65 R, 65 S, 65 P, 123/65 PD, 65 E, 65 A, 307, 661, 671

[56] References Cited

U.S. PATENT DOCUMENTS

| | | | |
|---|---|---|---|
| 2,736,306 | 2/1956 | McDuffie | 123/661 |
| 2,782,777 | 2/1957 | Jasper | 123/65 A |
| 4,236,490 | 12/1980 | Correll | 123/65 A |

FOREIGN PATENT DOCUMENTS

| | | | |
|---|---|---|---|
| 505072 | 8/1930 | Fed. Rep. of Germany | 123/65 A |
| 535123 | 4/1922 | France | 123/65 A |
| 652726 | 3/1929 | France | 123/661 |
| 152120 | 9/1983 | Japan | 123/661 |
| 117307 | 9/1946 | Sweden | 123/661 |

OTHER PUBLICATIONS

Morrell et al, "Oliver's New 1800 Tractor Engine", SAE Journal, vol. 69, No. 10, Oct. 1961.

*Primary Examiner*—Craig R. Feinberg
*Attorney, Agent, or Firm*—Harry M. Weiss & Associates

[57] ABSTRACT

A deflector piston two stroke internal combustion engine has a piston (10) reciprocable in a cylinder and sealed thereto by means of piston rings (P2), the cylinder having communicating with it a scavenge part SC2) and an exhaust part (E2). The piston crown has an upper first planar surface lying at right angles to the piston cylinder axis and a lower parallel planar surface, these two surfaces being connected by a deflector edge (D). The upper planar surface co-operates, at or near top-dead-center with a complementary planar surface on the interior (underside as shown) of the cylinder head with which it has a minimum clearance C2. The approach of these surfaces as top-dead-center is approached generates a "squish" that is a jet of fuel/air mixture in the direction of arrow (S2) towards the spark plug which improves combustion.

8 Claims, 2 Drawing Figures

DEFLECTOR PISTON TWO-STROKE ENGINE

This invention relates to a deflector piston two-stroke cycle internal combustion engine.

The deflector piston two-stroke cycle engine has some inherent advantages. These are:

(i) The exhaust and scavenge ports are arranged on opposite sides of the cylinder with the sides of the cylinder free of porting, and this allows close cylinder to cylinder spacing. Hence the design of multi-cylinder engines is more compact producing a lighter and smaller overall engine design for such power units.

Figure 1:
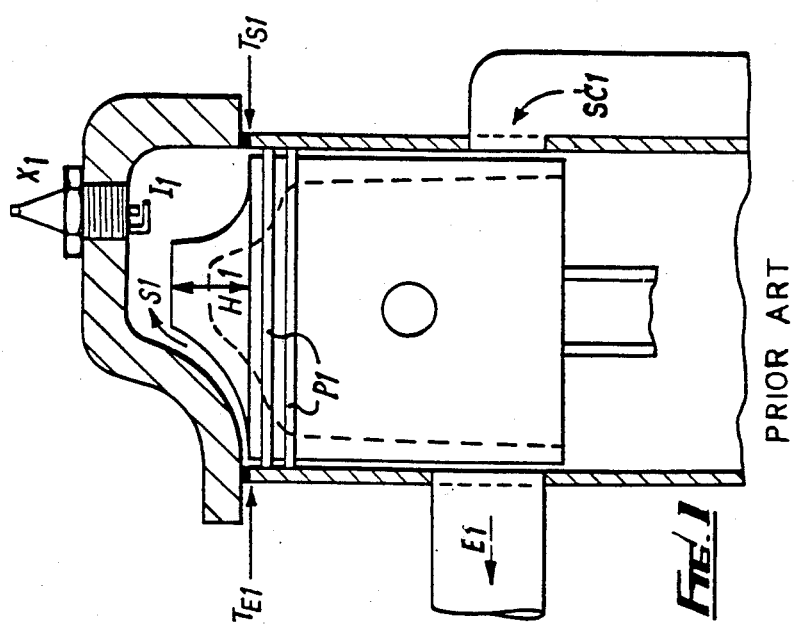

(ii) As there is a positive mechanical device, in the shape of a deflector on the piston, to promote the fresh air and fuel charge flow from the scavenge ports towards the cylinder head and away from the exhaust ports; such an engine tends to have good scavenging characteristics and such engines have, in general, excellent low speed performance behaviour. The scavenging process of the deflector piston engine is known as cross-scavenging and these engines are often described as cross-scavenged engines as well as deflector piston engines. A conventional deflector piston engine is shown in FIG. 1 with the piston at top-dead-centre position with its deflector of height H1 above the timing edges of the piston, $T_{E1}$ for the exhaust port or ports and $T_{S1}$ for the scavenge port or ports SC1. The piston rings P1 are located as close to these timing edges as is practical to ensure a good cylinder gas seal particularly when the piston rings P1 have uncovered the exhaust port and before the timing edge $T_{E1}$ does so releasing the burned air/fuel mixture or exhaust gas into the exhaust duct via the port or ports E1. Consequently the convenion design has the timing edges $T_{E1}$ and $TS_1$ located at the same vertical physical position on the piston by design and as close to the piston rings P1 as practical considerations permit. It is known that good scavenging is related, among other considerations, to deflector height H1 and in general, the taller deflector the better is the scavenging process. This produces undesirable side effects for the design of the combustion chamber. Whatever the height of deflector, because the timing edges $T_{E1}$ and $T_{S1}$ are at the same vertical position on the piston and separated by the deflector then, almost by definition, the combustion chamber becomes a divided chamber and cannot be described as a compact combustion chamber. In practice this produces a slow combustion process which results in inferior performance characteristics for the engine. Compounding this problem is the intrusion of the deflector into the combustion space with the consequence that it is difficult to effectively cool or transfer the heat away from the deflector to the body of the piston. Thus the deflector tends to run hot, to promote detonation in the best case and pre-ignition in worse circumstances. This again tends to limit the use of high compression ratios for the conventional engine which limits the theoretical, and experimental, efficiency of the power unit by comparison with engines where such effects do not occur. Often the deflector is so hot during the combustion process that more fuel than is normal must be introduced so as to cool the deflector and reduce the possibility of detonation or pre-ignition; this further reduces the power output and engine efficiency. Another important aim of the designers of combustion chambers is the generation of squish between the piston and the cylinder head to promote gas turbulence. This leads to faster flame propagation speeds in the combustion chamber, more rapid rates of pressure rise and shorter combustion times hence both theoretically, and experimentally, producing higher output and increased engine efficiency. To obtain this effect the designer must ensure that a considerable area of the piston surface mates closely with the cylinder head at the top-dead centre position and produces a high speed jet of turbulent fresh charge, designated S1 in FIG. 1, directed towards the flame and combustion created by the ignition $I_1$ at the spark-plug $X_1$. In the case of the conventional deflector piston-engine this is quite difficult to achieve in practice because of the often complex shape of deflector required for good scavenging characteristics and because of the manufacturing consideration of often having cast but not machined piston crowns and cylinder heads. While this close mating can be obtained, albeit with difficulty, in single cylinder experimental engines by hand finishing; it is very difficult to achieve in the mass production of multi-cylinder power units. Consequently, in the case of the conventional deflector piston, the combustion process is characterised by poor squish, slow combustion rates, hot piston crowns, incipient detonation or pre-ignition and a necessity for fuel cooling all of which results in inferior power and thermal efficiency characteristics by comparison with two-stroke cycle engines with compact combustion chambers and good squish characteristics. This has led to a decrease in popularity of the deflector piston engine design.

An object of the present invention, therefore, is to provide an improved deflector piston two-stroke engine.

Accordingly the invention provides a deflector piston two stroke engine comprising one or more piston/cylinder combination, each combination having a piston reciprocable in a cylinder towards and away from a cylinder head, the piston having on one side a first planar surface and on the other side a second planar surface more distant from the cylinder head than the first surface, and the cylinder head presenting a planar surface facing the piston and complementary to the first planar surface on the piston, the first planar surface of the piston and the planar surface of the cylinder head co-operating as the piston approaches top dead-centre to produce squish generating a flow of charge towards an ignitor in the cylinder head and the first planar surface of the piston providing a timing edge for an exhaust port of the cylinder and the lower planar surface of the piston providing a timing edge for a scavenge port of the cylinder, which ports are axially separated by a distance corresponding to the axial separation of the first and second planar surfaces on the piston.

Preferably the first planar surface of the piston amounts to a majority of the total area of the piston.

The transition between the two surfaces on the piston can be a shoulder which commences at right angles to the first surface and terminates tangentially to the second surface.

Figure 2:
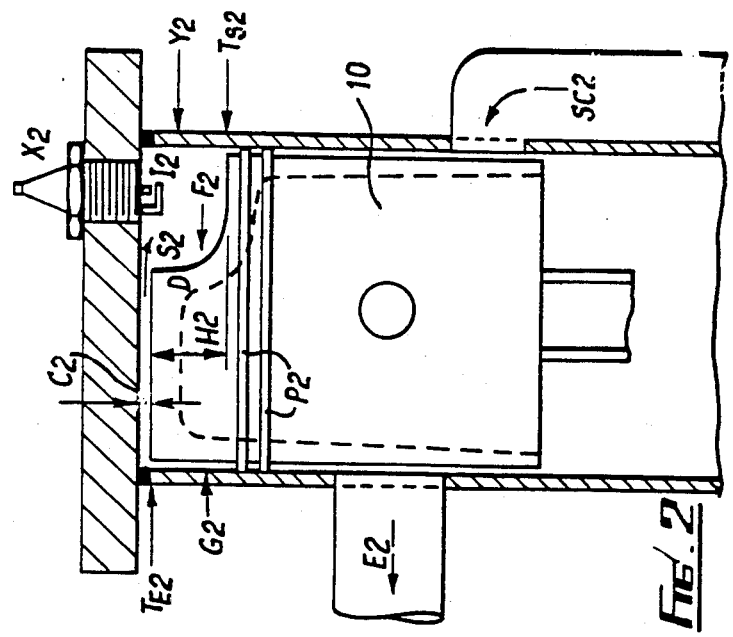

The invention will be described further, by way of example, with reference to the accompanying drawings, wherein:

FIG. 1 is a cross-sectional view of a previously known piston/cylinder combination; and FIG. 2 is a similar view of a preferred piston/cylinder combination of the invention.

A preferred piston/cylinder combination of the invention is shown in FIG. 2 and has a unique design of deflector piston 10 which allows conventional cross-scavenging to occur yet provide a compact combustion chamber with a strong squish action so as to promote rapid combustion thus yielding higher power output and superior thermal efficiency characteristics from the power unit. The superior combustion chamber compactness and the stronger squish action are achived by elevating the exhaust timing edge to the deflector height H2 thus giving an exhaust to scavenge port timing edge differential of height H2. This in turn necessitates elevating the entire exhaust port E2 by the same amount H2 and gives a longer cylinder liner length by the same amount. However the cylinder head surface is flat as is the piston crown on the exhaust side thereby enabling, control in mass production over the tolerance on the squish clearance C2 and so producing a consistent squish action for the jet S2. The compact combustion chamber lies between the deflector D and the cylinder wall on the scavenge side hence the hot portion of the piston crown where the major part of the combustion takes place is cooled during the scavenge process by the flow of the air/fuel mixture emanating from port or ports SC2. Thus a normal air/fuel mixture will provide quite adequate deflector cooling without recourse to the excess fuel cooling employed on the conventional designs. Further, the deflector is now better connected to the body of the piston giving superior heat transfer characteristics from the deflector and crown to the piston body and thence to the cylinder walls.

In a similar fashion to the conventional engine the sparking plug X2 can be located at the most appropriate point in the combustion chamber for optimum ignition characteristics but with the added advantage that in this proposed design it can be located alternatively in the cylinder wall at position Y2 which further reduces the overall height of the engine should that be deemed necessary. It should be noted also from comparisons of FIGS. 1 and 2 that while the cylinder liner is longer in the proposed design by comparison with the conventional layout, for equal deflector heights H2, the proposed design can have a slightly lower overall engine height.

It could be argued that in the proposed design cylinder gas leakage will occur down the exhaust port face of the piston and around the piston from the combustion chamber area once the piston rings P2 have uncovered the exhaust port E2 and thus give reduced power and thermal efficiency. However this does not occur for any such leakage would produce an inherent pressure drop from the cylinder to the exhaust duct and consequently the pressure force F2 on the piston deflector being greater than the leakage pressure force G2 will force the piston against the cylinder wall above the exhaust port and so seal that area from leakage flow. So it could be argued in reverse that this sealing characteristic of the proposed design is a superior sealing behaviour to that of the conventional piston.

I claim:

1. A two-stroke internal combustion engine, comprising:
    (A) a cylinder having a longitudinal axis;
    (B) a cylinder head having a flat planar surface completely closing one end of said cylinder;
    (C) a piston reciprocable within said cylinder in a direction coincident with said longitudinal axis towards and away from said cylinder head between a top dead center position wherein said piston and said cylinder head are closest together and a bottom dead center position wherein said piston and said cylinder head are furthest apart, a portion of said cylinder nearest said cylinder head constituting a piston crown;
    (D) a scavenge port providing an inlet for a combustible gas mixture to the cylinder on one side thereon; and
    (E) an exhaust port provididng an outlet for spent gases from the cylinder on an opposing side thereof, said exhaust and scavenge ports disposed, when said cylinder is viewed in plan, at diametrically opposite positions on the circumference of said cylinder, wherein:
    (a) said piston crown is shaped to have a first flat planar surface adjacent said one side of said cylinder and a second flat planar surface adjacent said opposing side of said cylinder, a peripheral edge of said second flat planar surface co-operating with said scavenge port during said reciprocating movement of said piston to constitute a timing edge for said scavenge port;
    (b) said piston crown is shaped to have said first flat planar surface nearer to said cylinder head than said second flat planar surface, a peripheral edge of said first flat planar surface co-operating with said exhaust port during said reciprocating movement of said piston to constitute a timing edge for said exhaust port;
    (c) said first and second flat planar surfaces are interconnected by a transition wall in said piston crown, said transition wall having a shoulder means for connecting at a sharp angle said first planar surface and having a smooth surface curvature to said second flat planar surface;
    (d) said scavenge port is disposed at a greater axial distance from said cylinder head than said exhaust port;
    (e) said cylinder head provides to said cylinder a flat planar surface lying in a plane parallel to the plane of said first flat planar surface on said piston, said flat planar cylinder head surface and said first flat planar surface on said piston being disposed in very close proximity at said top dead center position; and
    (f) an ignitor projecting into said cylinder extending to a point below said cylinder head and above said second flat planar surface so that when said piston is at said top dead center position, said ignitor is disposed in an ignitiion chamber defined by:
        (i) said second flat planar surface on said piston;
        (ii) a part of said flat planar surface on said cylinder head which is in axially facing relationship with said second flat planar surface;
        (iii) said transition wall on said piston crown extending between said first and second flat planar surfaces on said piston crown; and
        (iv) a part of side walling of said cylinder which is in radially facing relationship with said transsistion wall at top dead center.

2. A two-stroke internal combustion engine, comprising:
    (a) a cylinder having a longitudinal axis;
    (b) a cylinder head having a flat planar surface completely closing one end of said cylinder;
    (c) a piston reciprocable within said cylinder in a direction coincident with said longitudinal axis towards and away from said cylinder head between a top dead center position wherein said piston and said cylinder head are closest together and a bottom dead center position wherein said piston and said cylinder head are furthest apart, a portion of said cylinder nearest said cylinder head constituting a piston crown, said first and second flat planar surfaces are interconnected by a transition wall in said piston crown, said transition wall having a shoulder means for connecting at a sharp angle said first flat planar surface and having a smooth surface curvature to said second flat planar surface;

(d) a scavenge port providing an inlet for a combustible gas mixture to the cylinder on one side thereof; and (e) an exhaust port providing an outlet for spent gases from the cylinder on an opposing side thereof, said exhaust and scavenge ports disposed, when said cylinder is viewed in plan, at diametrically opposite axially spaced positions on the circumference of said cylinder with said exhaust port being located closer to said cylinder head, said piston crown is shaped to have a first flat planar surface ddjacent said one side of said cylinder and a second flat planar surface adjacent said opposing side of said cylinder, a peripheral edge of said second flat planar surface co-operating with said scavenge port during said reciprocating movement of said piston to constitute a timing edge for said scavenge port, (f) said piston crown is shaped to have said first flat planar surface nearer to said cylinder head than said second flat planar surface, a peripheral edge of said first flat planar surface co-operating with said exhaust port during said reciprocating movement of said piston to constitute timing edge for said exhaust port, and (g) said first and second flat planar surfaces are interconnected by a transition wall in said piston crown, said transition wall having a shoulder means for connecting at a sharp angle said first flat planar surface and having a smooth surface curvature to said second flat planar surface.

3. The two-stroke internal combustion engine as in claim 2 wherein said cylinder head provides to said cylinder a flat planar surface lying in a plane parallel to the plane of said first flat planar surface on said piston, said flat planar cylinder head surface and said first flat planar surface on said piston being disposed in very close proximity at said top dead center position.

4. The two-stroke internal combustion engine as in claim 2 further comprising said ignitor projecting into said cylinder through one of said cylinder head and a side walling of said cylinder so that when said piston is at said top dead center position, said ignitor is disposed in an ignition chamber defined by:

(i) said second flat planar surface on said piston;

(ii) a part of said flat planar surface on said cylinder head which is in axially facing relationship with said second flat planar surface;

(iii) said transition wall on said piston crown extending between said first and second flat planar surfaces on said piston crown; and (iv) a part of side walling of said cylinder which is in radially facing relationship with said transition wall at top dead center.

5. A deflector-piston two stroke engine, comprising: at least one piston/cylinder combination, each combination having a piston reciprocable in a cylinder towards and away from a cylinder head, said piston having on one side a first flat planar surface and on an opposing side a second flat planar surface more distant from said cylinder head than said first surface, said cylinder head having a flat planar surface which extends entirely across an upper end of the cylinder facing said piston and complementary to said first flat planar surface on said piston, said first flat planar surface of said piston and said planar surface of said cylinder head providing a means for co-operating as said piston approaches top dead-center to produce squish for generating a flow of charge towards an ignitor located above said second planar surface said first flat planar surface of said piston providing a means for producing timing edge for an exhaust port of said cylinder, said second planar surface of said piston providing a means for producing timing edge for a scavenge port of said cylinder, said exhaust and scavenge ports are axially separated by a distance corresponding to axial separation of the first and second flat planar surfaces on the piston, said first flat planar surface on said piston and said flat planar surface on said cylinder head moving into very close proximity upon said piston's approach to top dead center position for generating an essential squish flow, and having a transition between said two flat planar surfaces on said piston having a shoulder means for connecting at a sharp angle said first flat planar surface and having a smooth curvature to said second flat planar surface.

6. An engine as claimed in claim 5 wherein said first planar surface of said piston amounts to a majority of the total area of a top of said piston.

7. An engine as in claim 5 wherein said ignitor connects with an interior portion of said piston above said second flat planar surface via an aperture in one of a side walling of said cylinder and said cylinder head flat planar surface.

8. An engine as in claim 5 wherein each of said first and second flat planar surfaces on said piston are disposed at right angles to an axis of said piston/cylinder combination, and said flat planar surface on the cylinder head is also at a right angle to said piston/cylinder axis.

* * * * *